(12) United States Patent
Xu et al.

(10) Patent No.: US 11,260,528 B2
(45) Date of Patent: Mar. 1, 2022

(54) LOCALIZATION CORRECTION METHOD FOR ROBOT, COMPUTER READABLE STORAGE MEDIUM, AND ROBOT

(71) Applicant: UBTECH ROBOTICS CORP LTD, Shenzhen (CN)

(72) Inventors: Wenzhi Xu, Shenzhen (CN); Xiangbin Huang, Shenzhen (CN); Wenxue Xie, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 203 days.

(21) Appl. No.: 16/726,196

(22) Filed: Dec. 23, 2019

(65) Prior Publication Data

US 2021/0107147 A1 Apr. 15, 2021

(30) Foreign Application Priority Data

Oct. 10, 2019 (CN) .......................... 201910957976.0

(51) Int. Cl.
*B25J 9/16* (2006.01)
*G01C 21/04* (2006.01)
*G05D 1/02* (2020.01)

(52) U.S. Cl.
CPC .............. *B25J 9/1633* (2013.01); *B25J 9/163* (2013.01); *B25J 9/1664* (2013.01); *G01C 21/04* (2013.01); *G05D 1/024* (2013.01)

(58) Field of Classification Search
CPC ........ G01C 21/06; G01C 21/04; G01C 21/14; B25J 9/1633; B25J 9/1664; B25J 9/163;

(Continued)

(56) References Cited

U.S. PATENT DOCUMENTS

| 2007/0027612 A1* | 2/2007 | Barfoot | G05D 1/024 701/117 |
| 2016/0109883 A1* | 4/2016 | Sim | G01S 19/11 701/23 |

(Continued)

FOREIGN PATENT DOCUMENTS

| CN | 102519481 A | 6/2012 |
| CN | 104657981 A | 5/2015 |

OTHER PUBLICATIONS

"Theories and Methods of Target Tracking of Mobile Robots in Unknown Environments", Wu Ming, pp. 65-68, Northwestern Polytechnical University Press, Jan. 2018.

(Continued)

*Primary Examiner* — Abby Y Lin
*Assistant Examiner* — Dylan M Katz

(57) ABSTRACT

An localization correction method for a robot, comprising acquiring first position information of the robot in a first coordinate system; acquiring second position information of the robot in a second coordinate system after the robot executes a motion command; establishing a transformation model between the first position information and the second position information based on the first coordinate system and the second coordinate system; calculating a compensation value according to the transformation model; and generating a reset command according to the compensation value, and adjusting the localization of the robot according to the reset command.

18 Claims, 12 Drawing Sheets

(58) Field of Classification Search
CPC ....... B25J 9/161; B25J 11/0035; G05D 1/024; G05D 1/0272
See application file for complete search history.

(56) References Cited

U.S. PATENT DOCUMENTS

| | | | |
|---|---|---|---|
| 2019/0049566 A1* | 2/2019 | Adams | G01S 7/4972 |
| 2020/0110410 A1* | 4/2020 | Murai | G05D 1/0212 |
| 2020/0300631 A1* | 9/2020 | Lin | G01C 21/383 |
| 2021/0063200 A1* | 3/2021 | Kroepfl | G01C 21/1652 |

OTHER PUBLICATIONS

"The Optimal Registration Method of Point Cloud Model", Zhao Fuqun, pp. 28-31, Harbin Institute of Technology Press, Jul. 2018.
Cluster Computing for Robotics and Computer Vision, (United States) Damian M Lyons, pp. 69-71, Beijing Institute of Technology Press, Jan. 2015.

* cited by examiner

_US 11,260,528 B2_

LOCALIZATION CORRECTION METHOD FOR ROBOT, COMPUTER READABLE STORAGE MEDIUM, AND ROBOT

CROSS REFERENCE TO RELATED APPLICATIONS

This application claims priority to Chinese Patent Application No. 201910957976.0, filed Oct. 10, 2019, which are hereby incorporated by reference herein as if set forth in its entirety.

BACKGROUND

1. Technical Field

The present disclosure generally relates to robots, and particularly to a localization correction method for a wheeled robot.

2. Description of Related Art

Wheeled robots are known. Basically, the method of estimation for a wheeled robot's position uses the wheel encoder called odometry system. The basic concept of odometry is the transformation from wheel revolution to linear translation on the floor. This transformation is affected with errors by wheel slippage, unequal wheel diameter, inaccurate wheel base distance, unknown factor and others. As a result, the exact position and orientation of the robot may tend to deviate from the original planned course or path.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
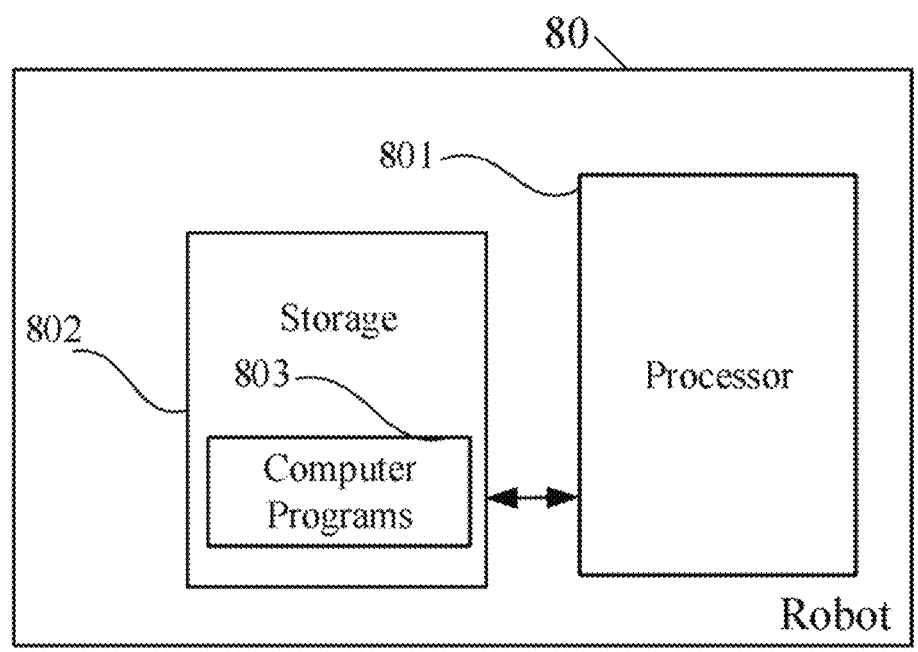
FIG. 1 is a schematic block diagram of a robot according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 12:
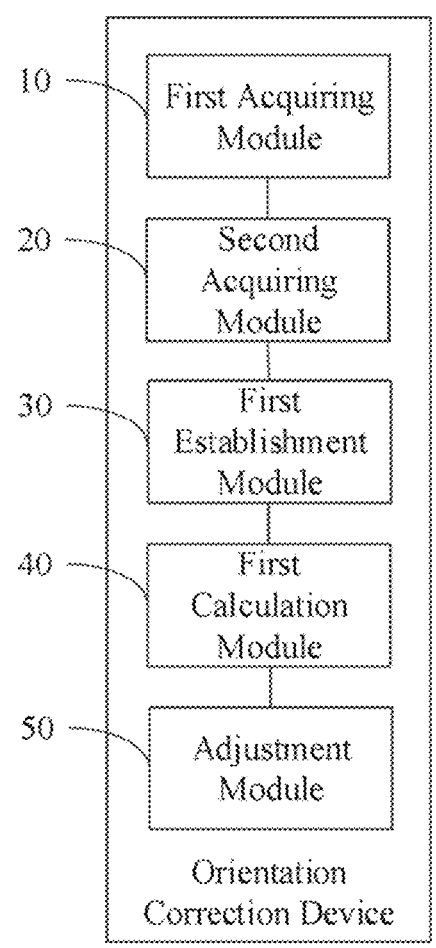
FIG. 12 is a schematic block diagram of a localization correction device according to one embodiment.

FIG. 1 is a schematic block diagram of a robot according to an embodiment. The robot 80 includes a processor 803, a storage 801, one or more computer programs 802 stored in the storage 801 and executable by the processor 803. When the processor 803 executes the computer programs 802, the steps in the embodiments of the method for controlling the robot 80, such as steps 101 through 105 in FIG. 2, and functions of modules/units in the embodiments, such as units 10 through 50 in FIG. 12, are implemented.

Exemplarily, the one or more computer programs 802 may be divided into one or more modules/units, and the one or more modules/units are stored in the storage 801 and executed by the processor 803. The one or more modules/units may be a series of computer program instruction segments capable of performing specific functions, and the instruction segments are used to describe the execution process of the one or more computer programs 802 in the robot 80. For example, the one or more computer programs 802 may be divided into a first acquiring module, a second acquiring module, a first establishment module, a first calculation module, and an adjustment module. The specific functions of each module are as follows:

The first acquiring module acquires first position information of the robot in a first coordinate system. The second acquiring module acquires second position information of the robot in a second coordinate system after the robot executes a motion command. The first establishment module establishes a transformation model between the first position information and the second position information based on the first coordinate system and the second coordinate system. The first calculation module calculates a compensation value according to the transformation model. The adjustment module generates a reset command according to the compensation value, and adjusts the localization of the robot according to the reset command.

It should be noted that FIG. 1 is merely an example of the robot 80, and does not limit the robot 80. The robot may include components different in numbers from those illustrated, or incorporate some other different components. For example, the robot may also include an input and output device, a network access device, a bus, and the like.

The processor 803 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 801 may be an internal storage unit of the robot 80, such as a hard disk or a memory. The storage 801 may also be an external storage device of the robot 80, such as a plug-in hard disk, a smart memory card (SMC), and a secure digital (SD) card, or any suitable flash cards. Furthermore, the storage 801 may also include both an internal storage unit and an external storage device. The storage 801 is used to store computer programs, other programs, and data required by the robot. The storage 801 can also be used to temporarily store data that have been output or is about to be output.

Figure 2:
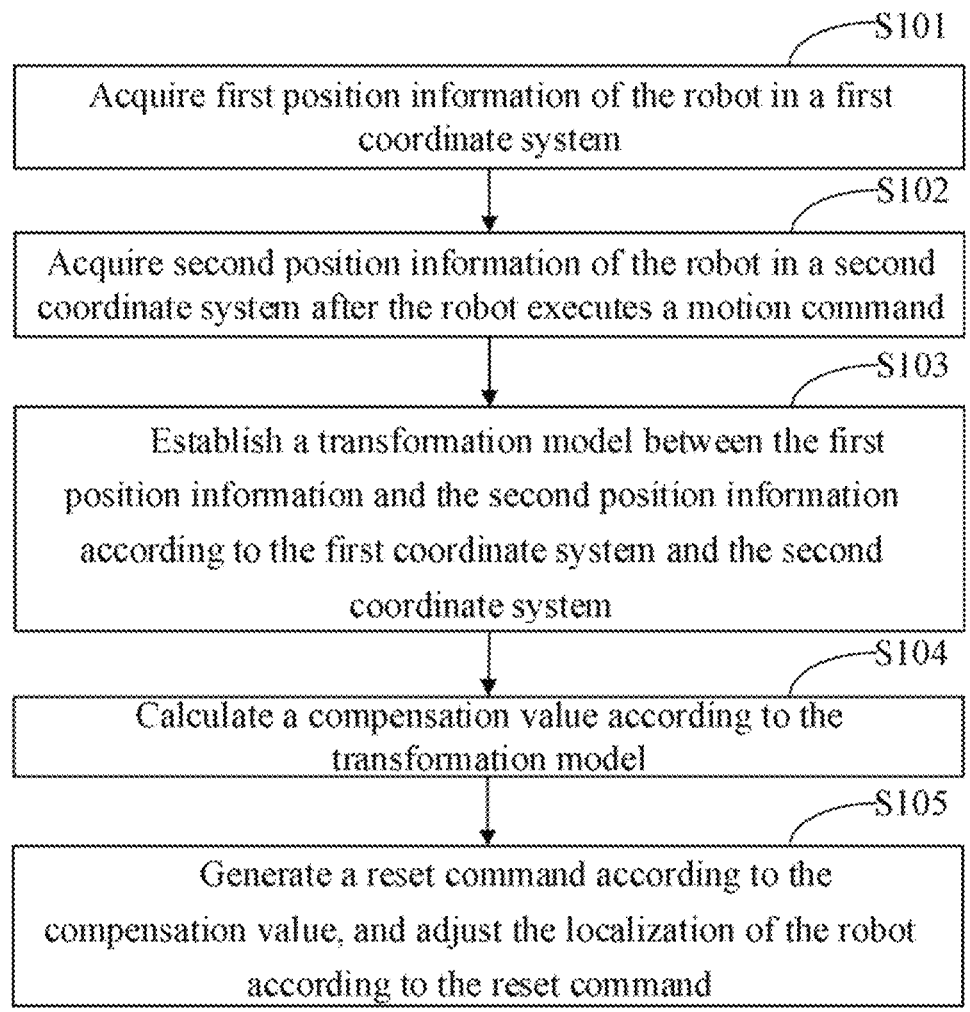
FIG. 2 is a flow chart of a localization correction method for the robot of FIG. 1 according to one embodiment.

FIG. 2 is a flow chart of a localization correction method for the robot 80 according to one embodiment. In the embodiment, the method includes the following steps:

Step S101: acquiring first position information of the robot 80 in a first coordinate system.

In one embodiment, TOF technology or structured light technology may be used to acquire the first position information. The technology above is known and will not be described in detail herein. The first position information is the initial position information of the robot 80. The initial position information may be obtained before the robot 80 executes a motion command for the first time, and will be compared with the position information obtained later to determine a localization error.

Figure 3:
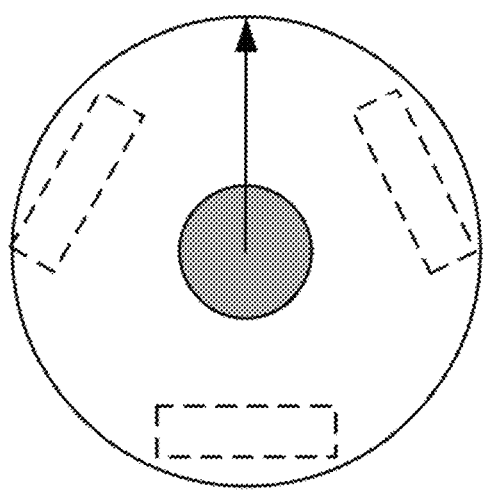
FIG. 3 is a schematic diagram of the robot of FIG. 1.

In the embodiment, the first coordinate system is established according to the first position information. The first coordinate system may be a two-dimensional coordinate system or a three-dimensional coordinate system. The first position information may be expressed by two-dimensional coordinates (a, b) or three-dimensional coordinates (a, b, c), which is not limited. For example, the first coordinate system may be a two-dimensional coordinate system, which uses the geometric center of the robot as an origin, an imaginary line extending along a direction directly in front of the robot as a Y axis, and an imaginary line extending along a horizontal direction and passing through the origin as an X axis. As shown in FIG. 3, the Y axis extends along the direction indicated by the arrow, and the X axis is not shown.

Step S102: acquiring second position information of the robot in a second coordinate system after the robot executes a motion command.

The second position information is acquired after the robot 80 executes the motion command in the same way the first position information. The second coordinate system and the first coordinate system are in the same number of dimensions. In the embodiment, the motion command instructs the robot 80 to rotate 360 degrees in place. That is, the robot 80 will spin about its own axis in response to the motion command. The motion command will be referred to as rotational motion command.

In the embodiment, the second coordinate system and the first coordinate system are both two-dimensional coordinate systems and have the same origin, X axis and Y axis. If the orientation or heading of the robot 80 deviates from that which is intended, an angle will be formed between the X axes of the first and the second coordinate systems and between the Y axes of the first and the second coordinate systems. The angle is the deviation angle of the orientation or heading of the robot 80. If there is no deviation in the orientation or heading of the robot 80, the X and the Y axes of the first coordinate system will respectively coincide with the X and the Y axes of the second coordinate system.

Step S103: establishing a transformation model between the first position information and the second position information based on the first coordinate system and the second coordinate system.

In one embodiment, the origins of the first and the second coordinate systems are the same. In other embodiments, the origins of the first and the second coordinate systems may be different. The first position information and the second position information have a transformation relationship. Specifically, if the first coordinate system and the second coordinate system have the same origins, the first position information can overlap with the second position information after rotation transformation. That is, the first position information can be expressed in the second coordinate system.

Step S104: calculating a compensation value according to the transformation model.

In one embodiment, the transformation model is used to calculate a rotation angle, determine a movement direction and calculate a movement distance after the first position information is transformed into the second position information. The calculated rotation angle, the movement direction, and the movement distance are all compensation values generated by the robot after executing the rotational motion command.

Step S105: generating a reset command according to the compensation value, and adjusting the localization of the robot according to the reset command.

In one embodiment, after the compensation value is calculated, the robot 80 will generate the reset command. The reset command is used to instruct the robot to spin about its own axis to compensate the angular error generated after the robot executes the motion command, and the compensation angle value equates to the calculated deviation angle value, so as to achieve the robot's posture correction. The deviation angle can be saved, and used to compensate for the next time when a new rotational motion command is received.

In one embodiment, if the compensation value is less than a preset value, such as 2 degrees, no compensation will be performed. That is, no reset command will be generated. When the next rotational motion command is executed, the second position information will be acquired again and compared with the first position information. In the embodiment, the first position information is the position information obtained and determined by the robot for the first time, and is then used as reference data for all the second position information obtained after the robot has executed the rotational motion commands. That is, the compensation value is calculated based on the original first position information as reference data. When the compensation value is greater than or equal to 2 degrees, a reset command is generated to adjust the localization of the robot.

In the embodiment, the first position information is acquired as reference data before the robot executes the rotational motion command, and the second position information is acquired after the robot has stopped after executing the rotational command. By establishing the coordinates and transformation model between the data information above and calculating the compensation value for error compensation, the accumulated positioning errors after the robot's movement can be eliminated, and automatic posture correction for the robot can be realized.

Figure 4:
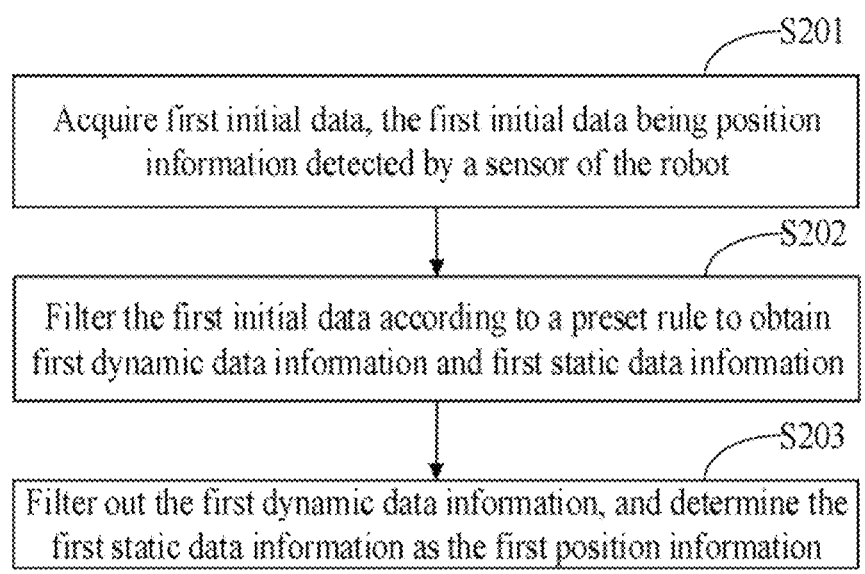
FIG. 4 is a flow chart of a localization correction method for the robot of FIG. 1 according to one embodiment.

Referring to FIG. 4, in one embodiment, the step S101 includes the following steps:

Step S201: acquiring first initial data, the first initial data being position information detected by a sensor of the robot.

Figure 5:
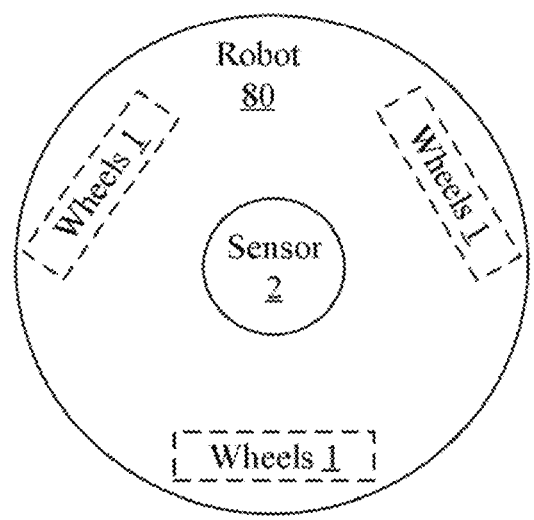
FIG. 5 is similar to FIG. 3 and includes a reference numeral denoting a sensor.

Referring to FIG. 5, in one embodiment, the robot 80 includes a number of wheels 1 and a sensor 2. The wheels 1 are rotatable and can drive the robot 80 to move or spin about its own axis. The sensor 2 is a light detection and ranging (lidar) device, and arranged in the base of the robot 80. The first position information is laser data obtained after the lidar device rotates 360 degrees and emits laser pulse. The laser data is used to identify the first position information of the robot. Specifically, the lidar is a two-dimensional laser scanner. The laser transmitter of the lidar can rotate 360 degrees while emitting laser light pulse. The laser pulse can be received by the laser receiver after reflected by an object. After real-time calculation, a distance between the robot and the object and a current angle information can be obtained. The generated laser data refers to the distance between the spot of the laser pulse on the object and the rotation center of the 2D laser scanner, and the angle between the light pulse and the X axis of the coordinate system of the two-dimensional laser scanner. The robot's position information is determined based on the distance and the angle. During the full rotation of 360 degrees, the two-dimensional laser scanner will emit many laser beams to obtain the geometric information of the surrounding environment. One frame laser data refers to the laser data obtained during full rotation of the two-dimensional laser scanner.

Step S202: filtering the first initial data according to a preset rule to obtain first dynamic data information and first static data information.

In one embodiment, the preset rule may be preset by robot makers or by a user. The preset rule may be to acquire only the laser data acquired by the lidar device at a predetermined angle range, for example, laser date acquired by laser pulses having polar angles greater than 10 degrees and less than 350 degrees in a polar coordinate system is first static data information, and laser date acquired by laser pulses having polar angles in the range of 0 through 10 degrees and 350 through 360 degrees is first dynamic data information. The pole of the polar system is the center of rotation of the laser transmitter of the lidar device, and the forward direction of the robot is the pole axis of the polar system.

Step S203: filter out the second dynamic data information, and determine the second static data information as the second position information.

In one embodiment, the laser data is used because it can reflect the information of the surrounding environment. The surrounding environment can be categorized into dynamic environment (changing environment due to many factors) and static environment (unchanging environment). Generally, since the audience watching the performance of the robot sit in front of the robot, the laser data acquired by laser pulses having polar angles in the range of 0 through 10 degrees and 350 through 360 degrees can be filtered out. One frame of laser data acquired in a static environment is saved. During continuous rotation of the robot, only the laser data before the rotation is collected as the reference laser data, and the laser data collected after each subsequent rotation will be matched with it so as to achieve no cumulative error.

In the embodiment, the first initial data in the static environment is acquired as the first position information, so as to avoid the problem that the compensation value generated when the second position information is matching the first position information is too large.

Figure 6:
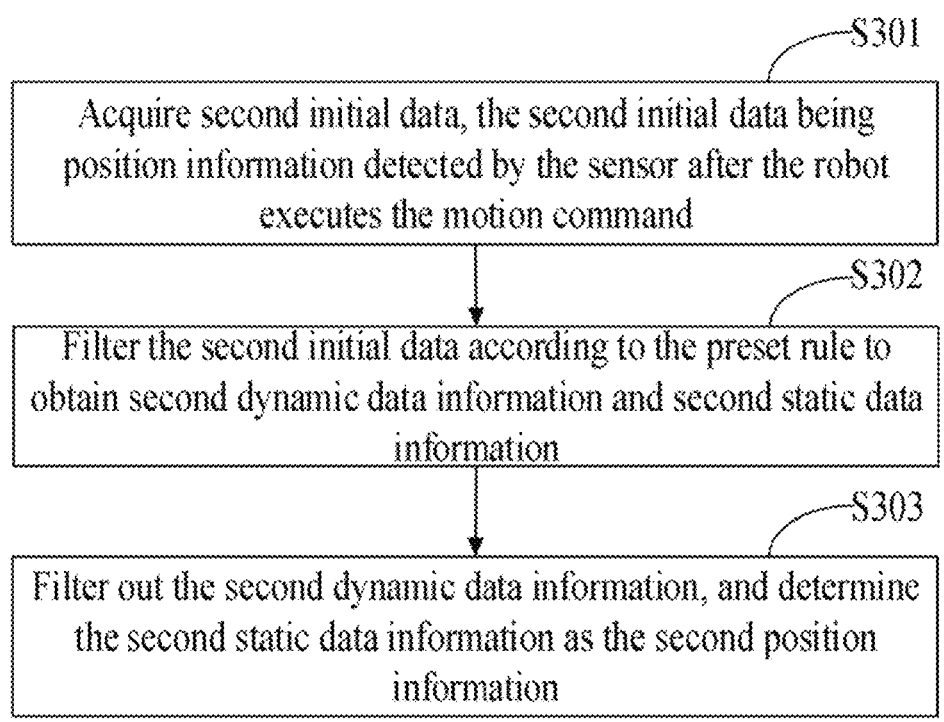
FIG. 6 is a flow chart of a localization correction method for the robot of FIG. 1 according to one embodiment.

Referring to FIG. 6, in one embodiment, step S102 includes the following steps:

Step S301: acquiring second initial data, the second initial data being position information detected by the sensor after the robot executes the motion command.

In one embodiment, the second initial data is acquired the same manner as the first initial data. That is, the second initial data is also obtained by the lidar device. The second initial data is obtained after the robot is at a standstill after executing the rotational motion command and after five laser transmitter of the lidar device rotates 360 degrees. The first initial data and the second initial data are both obtained when the robot is at a standstill, which improves the accuracy of the position information obtained by the lidar device.

Step S302: filtering the second initial data according to the preset rule to obtain second dynamic data information and second static data information.

In one embodiment the preset rule for filtering the second initial data are consistent with the preset rule for filtering the first initial data. It should be noted that the current forward direction of the robot deviates from the initial forward direction of the robot because of wheel slippage, unequal wheel diameter, inaccurate wheel base distance, unknown factor and others. Assuming that the deviation of the robot is a clockwise deviation of 5 degrees, which may be calculated by the odometer of the robot or an estimated value preset by a user. In the embodiment, the laser data acquired by laser pulses having polar angles greater than 15 degrees and less than 355 degrees in a polar coordinate system is the second static data information, and laser date acquired by laser pulses having polar angles in the range of 0 through 15 degrees and 355 through 360 degrees is the second dynamic data information.

Step S303: filtering out the second dynamic data information, and determine the second static data information as the second position information.

In one embodiment, in order to match the position information obtained successively as much as possible, after the robot continuously rotates, the laser data of the changed environment in front of the robot is eliminated as much as possible by filtering the data acquired by laser pulses having polar angles in the preset range, so as to reduce the proportion of dynamic data.

In the embodiment, by obtaining the first position information in the static environment and then obtaining the second position information in a slightly different static environment, the probability that the second position information matches the first position information is increased by increasing the proportion of static data in the position information above, which avoid the problem that the compensation value generated when the second position information is matched with the first position information is too large.

In one embodiment, the first coordinate system and the second coordinate system are both two-dimensional coordinate systems sharing the same origin. The step S103 includes acquiring a first data point set from the first position information. The first data point set includes a find position vector of each first data point.

In one embodiment, the laser data obtained by the lidar device is two-dimensional data. Two two-dimensional coordinate systems can be established, and the origin of the two-dimensional coordinate systems coincide. That is, the robot or the lidar device is used as the coordinate origin to create the two-dimensional coordinate systems.

In the embodiment, all the first data points in the first data point set corporately represent first position information. The first dale point set can be as follows: $X=\{X_i|i=1, 2, \ldots, N\}$, where X represents the first date point set, $X_i$ represents the ith first data point in the first data point set, the first position vector of each first data point is a vector (a, b) starting from the origin, and N is the number of first data points in the first data point set.

The step S103 further includes acquiring a second data point set from the second position information. The second data point set includes a second position vector of each second data point.

In one embodiment, all the second data points in the second data point set corporately represent second position information. The second date point set can be as follows: $P=\{P_j|j=1, 2, \ldots, M\}$, P represents the second date point set, $P_j$ represents the jth second data point in the second data point set, the second position vector of each second data point is a vector (c, d) starting from the origin, and M is the number of second data points in the second data point set. FIG. 6 shows the second data points obtained in one embodiment.

The step S103 further includes calculating a transformation model between the first data point set and the second data point set according to an iterative closest point (ICP) algorithm based on the first position vectors and the second position vectors, the transformation model comprises a translation vector and a rotation matrix.

In one embodiment, the first data point set and the second data point set include a plurality of the first position vectors and the second position vectors. Each first position information in the first data point set, and the closest point to the second position information of the second data point set can be determined, and then perform an iterative algorithm to obtain the transformation model. Each second position information in the second data point set, and the closest point to the first position information of the first data point set may also be determined and then perform the iterative algorithm to obtain the transformation model.

In one embodiment, the step of calculating a transformation model between the first data point set and the second data point set according to an iterative closest point (ICP) algorithm based on the first position vectors and the second position vectors, the transformation model comprises a translation vector and a rotation matrix, includes the following steps:

Finding a second data point matching each of the first data points in the second data point set, and calculating a matching error value according to a matching model, wherein the matching model is as follows:

$$E(R, t) = \frac{1}{N_x} \sum_{i=1}^{N_x} \|P_j - RX_i - t\|^2, \quad \text{where } E(R, t)$$

represents the mean squared error value of registration of the first data points and the second data points, $N_x$ represents a number of points in the first data point set, $X_i$ represents the first data point, $P_j$ represents the second data point, R represents the rotation matrix between the first data point set and the second data point set, and t represents the translation vector between the first data point set and the second data point set.

In one embodiment, the above-mentioned first data point set and the second data point set each correspond to a plurality of data points, and each data point corresponds to a respective first position vector or a second position vector. The second data point set in the second coordinate system may be searched for a second data point that matches each of the first data points, and the searching manner may include finding a second data point closest to each first data point.

In one embodiment, the first data point $X_i$ corresponds to a certain second data point $P_j$ in the second data point set. Specifically, E(R, t) is an unknown variable, $N_x$ is the number of points in the first data point set and is a known variable, $P_j$ is a second position vector of the jth second data point and is a known variable, and $X_i$ is the first position vector of the ith first data point and is known variable. R is a rotation matrix between X and P, and t is a translation vector between X and P, both of which are known variables. Therefore, the mean squared error value E(R, t) of the first data point and the second data point can be determined according to the matching model above.

Outputting the transformation model corresponding to the first data point set and the second data point set according to the first position vectors and the second position vectors registered according to the matching error value, the transformation model comprises the translation vector and the rotation matrix.

In one embodiment, the step above can determine the second data point registered for each first data point. Therefore, the rotation transformation matrix R and the translation vector t used for calculation at this time can be output to establish a transformation model correspondingly. Specifically, the point translation vector between a single first data point and a second data point is t'(c−a, d−b). Because the first data point set X has i first data points, i closest second data points can be found correspondingly in the second data point set P. Then, a translation vector and a rotation matrix of the two data point sets are obtained according to the position vectors between the i first data points and the i second data points, and according to a linear relationship. In two-dimensional space, the expressions of a rotation matrix and a rotation angle are fixed. Specifically, in a two-dimensional space, rotation can be defined by a single angle θ. Therefore, a transformation model regarding a rotation angle can be constructed based on the translation vector and the rotation matrix.

In one embodiment, the transformation model is to perform a matching calculation to the laser data before and after the robot rotates. An algorithm is used to register the data point sets X={$X_i$} and P={$P_j$} of two different coordinate systems to find the transformation relationship (including the translation vector and the rotation matrix) between the two data point sets. The purpose is to accurately calculate the transformation relationship between the two data point sets based on the registered first data points and the second data points. The coordinate systems that is created by using the robot as the coordinate origins are advantageous for calculating the transformation relationship between the first position information and the second position information.

In one embodiment, the step of acquiring a first data point set from the first position information, includes the following steps:

Acquiring an odometer compensation value. In one embodiment, the odometer compensation value is calculated based on the feedback value of the encoder inside the robot and the kinematic model of the robot. The encoder is a rotary encoder, which is composed of a grating disc (indexing disc) and a photoelectric detection device (receiver). The grating disc is a circular plate with several rectangular slots arranged evenly along a circumferential direction. The grating disk is coaxial with a motor output shaft of the robot. When the motor rotates, the grating disk rotates together with the motor output shaft. The light-emitting diode illuminates the grating disk, and projects the image of the grating disk onto a photodetection device (receiver) including a photosensitive element. The light change generated by the rotation of the grating disk is convened and output as a corresponding pulse signal. The rotation angle of the motor output shaft can thus be measured so as to determine the rotation angle of wheels. The deviation of the robot can then be calculated based on the kinematic model of the robot. If the deviation of the robot is obtained according to the relationship between the angle and the rotation matrix, the deviation is used as the odometry compensation value of the robot.

Initializing the first data points in the first data point set according to the odometer compensation value to acquire first transformed data points. Acquiring position vectors of the first transformed data points as the first position vectors.

Figure 7:
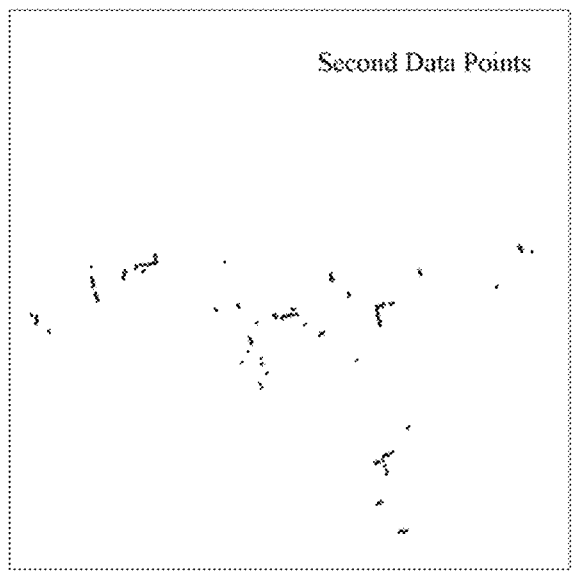
FIG. 7 is a schematic diagram of a distribution of second data points obtained according to the method of FIG. 6.
Figure 8:
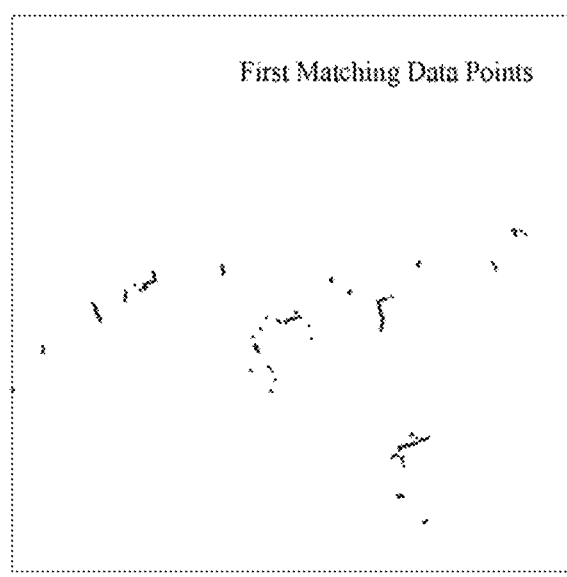
FIG. 8 is a schematic diagram of a distribution of first matching data points obtained according to a localization correction method according to one embodiment.

In one embodiment, the factors that cause the robot to deviate after rotation include not only the odometer error obtained through preliminary calculation based on the kinematic model, but also the error accumulation of the odometer and the slippage of the wheels on floor/ground. Other errors can be calculated by laser data obtained by the lidar device. Therefore, in order to accurately calculate the compensation value of the laser data obtained by the lidar device, the first data points need to be initialized. For example, odometer error compensation is performed to reduce or eliminate the influence of the odometer on the first data points, thereby reducing the error value of the registration of the second data points with the first data points. FIG. 7 shows the first matching data points obtained after the first data point is initialized.

In the embodiment, the odometer error compensation is performed by initializing the first data point, which can eliminate the accumulated odometer error after the robot moves, and improve the accuracy of the robot's automatic posture correction.

In one embodiment, the step of finding a second data point matching each of the first data points in the second data point set, and calculating a matching error value according to a matching model, includes using all the first transformed data points in the first data point set as first matching data points in sequence, the first matching data points being in the second coordinate system; and finding a second matching data point closest to each of the first matching data points in the second data point set.

In the embodiment, the first transformed data points are obtained after the first data points are initialized with the odometer error compensated. Therefore, it can be preliminarily considered that the first data points after initial compensation and the second matching data points in the second coordinate system substantially coincide. That is, the first transformed data points are considered to be in the second coordinate system. In the second data point set, searching for the second matching data point closest to each first matching data point, and the searching manner may include finding a second data point closest to each first data point. The distance between two data points can be calculated according to the first position vector and the second position vector. A first one of the first transformed data points in the first point set is first determined, and the distance between it and each second data point in the second data point set P is then calculate. The one with the smallest distance can be determined as the closest second matching data point.

The step of finding a second data point matching each of the first data points in the second data point set, and calculating a matching error value according to a matching model, further includes: calculating a transformation rotation matrix and a transformation translation vector between the first data point set and the second data point set according to the first position vectors of the first matching data points and the second position vectors of the second matching data points; calculating the matching error value using the matching model according to the transformation rotation matrix and the transformation translation vector; and determining whether an operation process of the matching error value meets a termination condition; and if so, outputting the matching error value.

In the embodiment, the transformation rotation matrix and transformation translation vector are obtained by performing calculations to the first position vectors of all first transformed data points and the second position vectors of all second matched data points, and are the overall transformation model between the two point sets. Specifically, the curve fitting equation K (z) of the discrete points in the first data point set and the curve equation Y (x) of the discrete points in the second data point set can be fitted using the data fining method at the discrete points. The curve type can be linear fitting, Gaussian curve, and smooth curve, etc., and selected according to actual need. The transformation rotation matrix and transformation translation vector between the first data point set and the second data point set are calculated according to two fitting function expressions. Alternatively, the rotation matrix and translation vector can be calculated based on the position vector and linear relationship between each first matching data point and the corresponding second matching data point.

In one embodiment, the termination condition includes, but are not limited to, the number of times the algorithm used for calculation reaching a preset number of times, and the mean squared error value being less than a preset threshold. Specifically, if the matching error value obtained by using the above-mentioned transformation model is less than 0.1, it is considered that the operation process meets the termination condition.

In one embodiment, in order to accurately match the data points in the second data point set with the data points in the first data point set, the calculation termination conditions are set and the optimal matching error value is calculated to achieve the purpose of accurate compensation after the robot rotates.

In one embodiment, the method further includes: calculate the current error compensation value according to the transformation rotation matrix and the translation vector if the operation process of the matching error value docs not meet the termination condition; initializing the first transformed data points according to the error compensation value to obtain a new first transformed data points; searching for a new second matching data point closest to each of the new first transformed data points in the second data point set; and repeating the operation process until the operation process meets the termination condition, and then outputting the current matching error value as the final matching error value.

In one embodiment, the operation process above is an iterative algorithm operation process. Specifically, the operation process includes: 1) obtaining an initial rotation matrix R' and initial translation vector t' from the odometer of the robot; 2) initializing the first data points in the first data point set to obtain the first matching data points, at this time, all the first matching data points are in the second coordinate system, and the new first data point set is represented by X'; 3) in the second data point set P, finding each first matching data point in the new first data point set, each first matching data point and the point closest to it forming a point-point relationship of the closest point, and M point pairs can be found because there are M points in the second data point set P; 4) calculating the relation matrix R" and translation vector t" of the new first data point set X' and the second data point set P according to the point pairs of the M nearest points, and according to the linear relationship and the position vectors; 5) calculating the matching error value according to the matching model; 6) if the calculation process of the matching error value does not meet the termination condition, calculating the current error compensation value according to the rotation matrix R" and translation vector t", compensating the first matching data points in the first data point set X' to obtain a new first data point set X″ again, and repeating the steps 3), 4), 5), and 6) until operation process of the matching error value meets the termination condition.

In one embodiment, the step S105 includes: outputting a rotation matrix R and a translation vector t between the first matching data point set and the second matching data point set according to the matching error value when the matching error value is obtained, and calculating a first deviation angle and a first deviation position according to the rotation matrix and the translation vector t.

Figure 9:
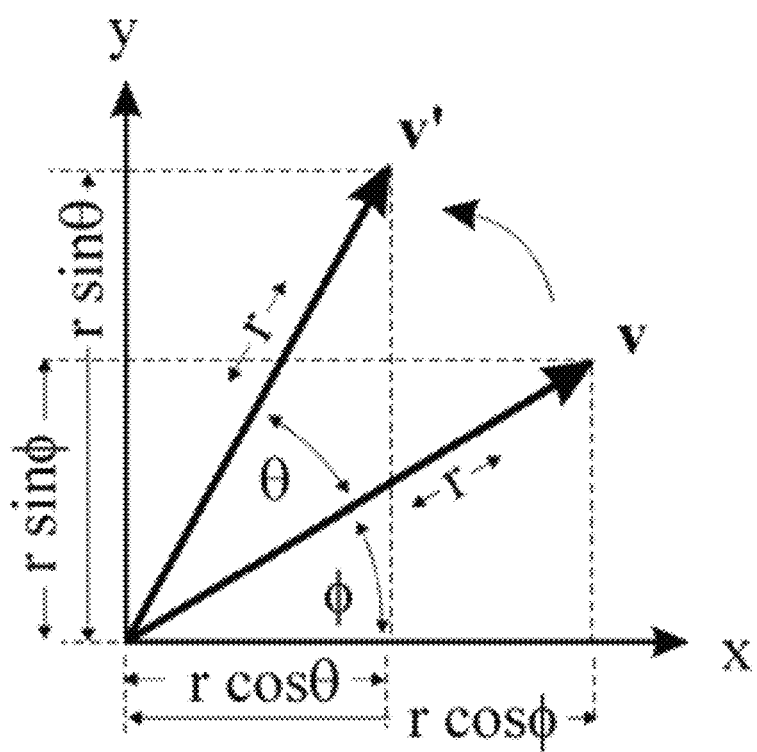
FIG. 9 is a schematic diagram showing the mathematical principle of calculation of a rotation angle.

In one embodiment, the matching error value is calculated based on the first data point set after being repeatedly calculated according to the iterative algorithm to perform compensation and the second data point set. Therefore, the translation vector t and rotation matrix R corresponding to the current matching error value can be obtained correspondingly. Referring to FIG. 9, assume that coordinates of the first matching data point V are represented as (x, y), the coordinates of the second matching data point are represented as (x', y'), the distance between each of the first matching data point V and the second matching data point and the origin of the coordinate system is r, the angle between the vector from the origin to the point V and the X axis is $\varphi$, and the rotation angle is $\theta$, then we have the following: x=r cos $\varphi$; y=r sin $\varphi$; x'=r cos($\theta$+$\varphi$); y'=r sin($\theta$+$\varphi$) and x'=r cos $\theta$ cos $\varphi$−r sin $\theta$ sin $\varphi$; y'=r sin $\theta$ cos $\varphi$+r cos $\theta$ sin $\varphi$. We then get x'=x cos $\theta$−y sin $\theta$; y'=x sin $\theta$+y cos $\theta$ based on the two equations above. Finally, we have the following:

$$R = \begin{bmatrix} \cos\theta & -\sin\theta \\ \sin\theta & \cos\theta \end{bmatrix},$$

where R represents the rotation matrix.

In one embodiment, the step S105 further includes: compensating the second data points in the second data point set according to the first deviation angle and the first deviation position to obtain compensated matching data points; and determining a number of ones of the compensated matching data points that satisfy following condition: a matching degree of each of the ones of the compensated matching data points and a corresponding one of the first matching data points satisfies a predetermined condition.

In one embodiment, the compensated matching data points are compensation matching data points obtained after the second data points in the second data point set are compensated with the rotation angle $\theta$, and are used for registration with the first matching data points. The compensated matching data points should have data points that partially overlap the first matching data points. The number of ones of the compensated matching data points that satisfy the above-mentioned condition is counted.

In one embodiment, the predetermined condition may be that the compensated matching data points overlap the first matching data points, or the distance between each of the ones of the compensated matching data points and a corresponding one of the first matching data points is less than a preset value. The distance can be calculated according to the position vector between each of the ones of the compensated matching data points and a corresponding one of the first matching data points.

In one embodiment, the step S105 further includes: acquiring a second deviation angle and a second deviation position corresponding to the odometer compensation value if the number is greater than a first threshold, and generating the reset command according to the second deviation angle and the second deviation position, and adjusting the localization of the robot according to the reset command.

Figure 10:
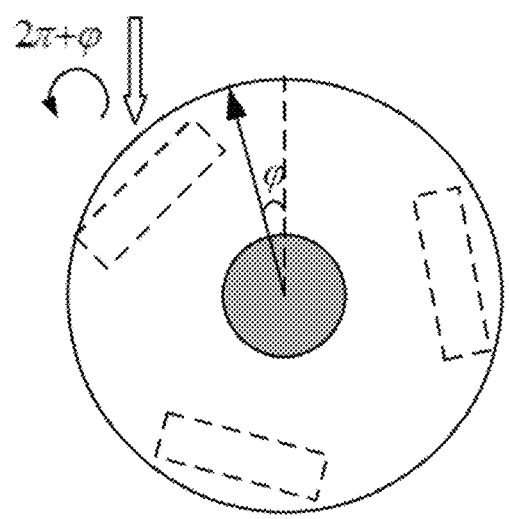
FIG. 10 is similar to FIG. 3 and shows a clockwise deviation angle generated by the robot during the rotation.
Figure 11:
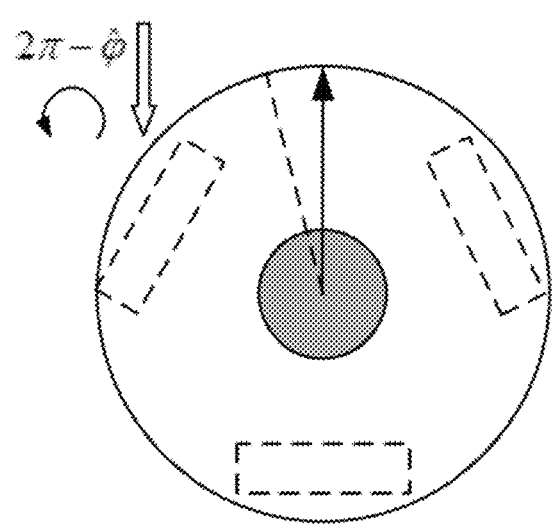
FIG. 11 is similar to FIG. 3 and shows that the localization deviation has been corrected.

In one embodiment, the first threshold may be the proportion of the number of ones of the compensated matching data points that satisfy the condition above among all compensated matching data points. For example, if there are 10 compensated matching data points and the number of ones of the compensated matching data points that satisfy the condition above is greater than or equal to 7, then the number is greater than the first threshold. The second deviation angle is the rotation angle $\theta$ calculated according to the rotation matrix R. The first matching data points are first transformed data points obtained by initializing the first data points. When performing compensation, it needs to superimpose the second deviation angle corresponding to the odometer compensation value to obtain the target compensation angle, a reset command is generated, and angular position of the robot is adjusted. FIG. 10 shows the clockwise deviation angle $\phi$ generated by the robot during the rotation. Therefore, the robot can be controlled to rotate clockwise by 2$\pi$−$\phi$ to return to the initial position, which is shown in FIG. 11.

In the embodiment, the robot obtains the first position information as reference data before executing the motion command, obtains the second position information after the robot performs the motion command and is still, and calculates the compensation value for error compensation by establishing the coordinates and transformation model of the data information, which can eliminate the accumulated positioning errors after the robot moves, realize the robot's automatic posture correction, and improve the robot's adaptive ability.

Referring to FIG. 12, in one embodiment, a localization correction device 100 for a robot includes a first acquiring module 10, a second acquiring module 20, a first establishment module 30, a first calculation module 40 and an adjustment module 50. The first acquiring module 10 acquires first position information of the robot in a first coordinate system. The second acquiring module 20 acquires second position information of the robot in a second coordinate system after the robot executes a motion command. The first establishment module 30 establishes a transformation model between the first position information and the second position information based on the first coordinate system and the second coordinate system. The first calculation module 40 calculates a compensation value according to the transformation model. The adjustment module 50 generates a reset command according to the compensation value, and adjusts the localization of the robot according to the reset command.

In one embodiment, the localization correction device may be a hardware inside the robot, or may be the robot itself, which is not limited thereto.

In one embodiment, the robot includes a sensor. The first acquiring module 10 is further used to: acquire first initial data, the first initial data being position information detected by a sensor of the robot; filter the first initial data according to a preset rule to obtain first dynamic data information and first static data information; and filter out the first dynamic data information, and determine the first static data information as the first position information.

In one embodiment, the second acquiring module 20 is further used to: acquire second initial data, the second initial data being position information detected by the sensor after the robot executes the motion command; filter the second initial data according to the preset rule to obtain second dynamic data information and second static data information; and filter out the second dynamic data information, and determine the second static data information as the second position information.

In one embodiment, the second coordinate system and the first coordinate system are both two-dimensional coordinate systems and have the same origin. The fist establishment module 30 is further used to: acquire a first data point set from the first position information, the first data point set comprising a first position vector of each first data point; acquire a second data point set from the second position information, the second data point set comprising a second position vector of each second data point; calculate a transformation model between the first data point set and the second data point set according to an iterative closest point (ICP) algorithm based on the first position vectors and the second position vectors. The transformation model includes a translation vector and a rotation matrix.

In one embodiment, the fist establishment module 30 is further used to:

Find a second data point matching each of the first data points in the second data point set, and calculate a matching error value according to a matching model, wherein the matching model is as follows:

$$E(R, t) = \frac{1}{N_x} \sum_{i=1}^{N_x} \|P_j - RX_i - t\|^2,$$

where E(R, t) represents the mean squared error value of registration of the first data points and the second data points, $N_x$ represents a number of points in the first data point set, $X_i$ represents the first data point, $P_j$ represents the second data point, R represents the rotation matrix between the first data point set and the second data point set, and t represents the translation vector between the first data point set and the second data point set; and Output the transformation model corresponding to the first data point set and the second data point set according to the first position vectors and the second position vectors registered according to the matching emir value. The transformation model includes the translation vector and the rotation matrix.

In one embodiment, the fist establishment module 30 is further used to: acquire an odometer compensation value; initialize the first data points in the first data point set according to the odometer compensation value to acquire first transformed data points; and acquire position vectors of the first transformed data points as the first position vectors.

In one embodiment, the first establishment module 30 is further used to: use all the first transformed data points in the first data point set as first matching data points in sequence, the first matching data points being in the second coordinate system; find a second matching data point closest to each of the first matching data points in the second data point set; calculate a transformation rotation matrix and a transformation translation vector between the first data point set and the second data point set according to the first position vectors of the first matching data points and the second position vectors of the second matching data points; calculate the matching error value using the matching model according to the transformation rotation matrix and the transformation translation vector; and determine whether an operation process of the matching error value meets a termination condition; and if so, output the matching error value.

In one embodiment, the adjustment module 50 is further used to: output a rotation matrix R between the first matching data point set and the second matching data point set according to the matching error value when the matching error value is obtained; calculate a first deviation angle according to the rotation matrix; compensate the second data points in the second data point set according to the first deviation angle to obtain compensated matching data points; determine a number of ones of the compensated matching data points that satisfy following condition: a matching degree of each of the ones of the compensated matching data points and a corresponding one of the first matching data points satisfies a predetermined condition; acquire a second deviation angle corresponding to the odometer compensation value if the number is greater than a first threshold, and generate the reset command according to the first deviation angle and the second deviation angle, and adjust the localization of the robot according to the reset command.

In the embodiment, the robot obtains the first position information as reference data before executing the motion command, obtains the second position information after the robot performs the motion command and is still, and calculates the compensation value for error compensation by establishing the coordinates and transformation model of the data information, which can eliminate the accumulated positioning errors after the robot moves, realize the robot's automatic posture correction, and improve the robot's adaptive ability.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A computer-implemented localization correction method for a robot, comprising executing on a processor steps of:
　　acquiring first position information of the robot in a first coordinate system;
　　acquiring second position information of the robot in a second coordinate system after the robot executes a motion command;
　　establishing a transformation model between the first position information and the second position information based on the first coordinate system and the second coordinate system;
　　calculating a compensation value according to the transformation model; and
　　generating a reset command according to the compensation value, and adjusting the localization of the robot according to the reset command;
　　wherein the first coordinate system and the second coordinate system are both 2D coordinate systems sharing an origin, and the step of establishing a transformation model between the first position information and the second position information based on the first coordinate system and the second coordinate system, comprises:
　　　acquiring a first data point set from the first position information, the first data point set comprising a first position vector of each first data point;
　　　acquiring a second data point set from the second position information, the second data point set comprising a second position vector of each second data point; and
　　　calculating a transformation model between the first data point set and the second data point set according to an iterative closest point (ICP) algorithm based on the first position vectors and the second position vectors, the transformation model comprising a translation vector and a rotation matrix;
　　wherein the step of calculating a transformation model between the first data point set and the second data point set according to an iterative closest point (ICP) algorithm based on the first position vectors and the second position vectors, comprises:
　　　finding a second data point matching each of the first data points in the second data point set, and calculating a matching error value according to a matching model, wherein the matching model is as follows:

$$E(R, t) = \frac{1}{N_x} \sum_{i=1}^{N_x} \|P_j - RX_i - t\|^2,$$

where $E(R, t)$ represents the mean squared error value of registration of the first data points and the second data points, $N_x$ represents a number of points in the first data point set, $X_i$ represents the first data point, $P_j$ represents the second data point, $R$ represents the rotation matrix between the first data point set and the second data point set, and $t$ represents the translation vector between the first data point set and the second data point set; and
　　　outputting the transformation model corresponding to the first data point set and the second data point set according to the first position vectors and the second position vectors registered according to the matching error value, the transformation model comprises the translation vector and the rotation matrix; and
　　wherein the step of acquiring a first data point set from the first position information, comprises:
　　　acquiring an odometer compensation value;
　　　initializing the first data points in the first data point set according to the odometer compensation value to acquire first transformed data points; and
　　　acquiring position vectors of the first transformed data points as the first position vectors.

2. The method according to claim 1, wherein the step of acquiring first position information of the robot in a first coordinate system, comprises:
　　acquiring first initial data, the first initial data being position information detected by a sensor of the robot;

filtering the first initial data according to a preset rule to obtain first dynamic data information and first static data information; and filtering out the first dynamic data information, and determining the first static data information as the first position information.

3. The method according to claim 2, wherein the step of acquiring second position information of the robot in a second coordinate system after the robot executes a motion command, comprises:

acquiring second initial data, the second initial data being position information detected by the sensor after the robot executes the motion command;

filtering the second initial data according to the preset rule to obtain second dynamic data information and second static data information; and filtering out the second dynamic data information, and determining the second static data information as the second position information.

4. The method according to claim 1, wherein the step of finding a second data point matching each of the first data points in the second data point set, and calculating a matching error value according to a matching model, comprises:

using all the first transformed data points in the first data point set as first matching data points in sequence, the first matching data points being in the second coordinate system;

finding a second matching data point closest to each of the first matching data points in the second data point set;

calculating a transformation rotation matrix and a transformation translation vector between the first data point set and the second data point set according to the first position vectors of the first matching data points and the second position vectors of the second matching data points;

calculating the matching error value using the matching model according to the transformation rotation matrix and the transformation translation vector; and determining whether an operation process of the matching error value meets a termination condition; and if so, outputting the matching error value.

5. The method according to claim 4, wherein the step of generating a reset command according to the compensation value, and adjusting the localization of the robot according to the reset command, comprises:

outputting a rotation matrix and a translation vector between the first matching data point set and the second matching data point set according to the matching error value when the matching error value is obtained;

calculating a first deviation angle and a first deviation position according to the rotation matrix and the translation vector;

compensating the second data points in the second data point set according to the first deviation angle and the first deviation position to obtain compensated matching data points;

determining a number of ones of the compensated matching data points that satisfy following condition: a matching degree of each of the ones of the compensated matching data points and a corresponding one of the first matching data points satisfies a predetermined condition;

acquiring a second deviation angle and a second deviation position corresponding to the odometer compensation value if the number is greater than a first threshold, and generating the reset command according to the second deviation angle and the second deviation position, and adjusting the localization of the robot according to the reset command.

6. A robot comprising
one or more processors;
a storage; and
one or more computer programs stored in the storage and configured to be executed by the one or more processors, and the one or more computer programs being configured to execute a method, the method comprising steps of:

acquiring first position information of the robot in a first coordinate system;

acquiring second position information of the robot in a second coordinate system after the robot executes a motion command;

establishing a transformation model between the first position information and the second position information based on the first coordinate system and the second coordinate system;

calculating a compensation value according to the transformation model; and generating a reset command according to the compensation value, and adjusting the localization of the robot according to the reset command;

wherein the first coordinate system and the second coordinate system are both 2D coordinate systems sharing an origin, and the step of establishing a transformation model between the first position information and the second position information based on the first coordinate system and the second coordinate system, comprises:

acquiring a first data point set from the first position information, the first data point set comprising a first position vector of each first data point;

acquiring a second data point set from the second position information, the second data point set comprising a second position vector of each second data point; and calculating a transformation model between the first data point set and the second data point set according to an iterative closest point (ICP) algorithm based on the first position vectors and the second position vectors, the transformation model comprising a translation vector and a rotation matrix:

wherein the step of calculating a transformation model between the first data point set and the second data point set according to an iterative closest point (ICP) algorithm based on the first position vectors and the second position vectors, comprises:

finding a second data point matching each of the first data points in the second data point set, and calculating a matching error value according to a matching model, wherein the matching model is as follows:

$$E(R, t) = \frac{1}{N_x} \sum_{i=1}^{N_x} \|P_j - RX_i - t\|^2,$$

where E(R, t) represents the mean squared error value of registration of the first data points and the second data points, $N_x$ represents a number of points in the first data point set, $X_i$ represents the first data point, $P_j$ represents the second data point, R represents the rotation matrix between the first data point set and the second data point set, and t represents the translation vector between the first data point set and the second data point set; and outputting the transformation model corresponding to the first data point set and the second data point set according to the first position vectors and the second position vectors registered according to the matching error value, the transformation model comprises the translation vector and the rotation matrix:

wherein the step of acquiring a first data point set from the first position information, comprises:

acquiring an odometer compensation value;

initializing the first data points in the first data point set according to the odometer compensation value to acquire first transformed data points; and acquiring position vectors of the first transformed data points as the first position vectors.

7. The robot according to claim 6, wherein the step of acquiring first position information of the robot in a first coordinate system, comprises:

acquiring first initial data, the first initial data being position information detected by a sensor of the robot;

filtering the first initial data according to a preset rule to obtain first dynamic data information and first static data information; and filtering out the first dynamic data information, and determining the first static data information as the first position information.

8. The robot according to claim 7, wherein the step of acquiring second position information of the robot in a second coordinate system after the robot executes a motion command, comprises:

acquiring second initial data, the second initial data being position information detected by the sensor after the robot executes the motion command;

filtering the second initial data according to the preset rule to obtain second dynamic data information and second static data information; and filtering out the second dynamic data information, and determining the second static data information as the second position information.

9. The robot according to claim 6, wherein the step of finding a second data point matching each of the first data points in the second data point set, and calculating a matching error value according to a matching model, comprises:

using all the first transformed data points in the first data point set as first matching data points in sequence, the first matching data points being in the second coordinate system;

finding a second matching data point closest to each of the first matching data points in the second data point set;

calculating a transformation rotation matrix and a transformation translation vector between the first data point set and the second data point set according to the first position vectors of the first matching data points and the second position vectors of the second matching data points;

calculating the matching error value using the matching model according to the transformation rotation matrix and the transformation translation vector; and determining whether an operation process of the matching error value meets a termination condition; and if so, outputting the matching error value.

10. The robot according to claim 9, wherein the step of generating a reset command according to the compensation value, and adjusting the localization of the robot according to the reset command, comprises:

outputting a rotation matrix and a translation vector between the first matching data point set and the second matching data point set according to the matching error value when the matching error value is obtained;

calculating a first deviation angle and a first deviation position according to the rotation matrix and the translation vector;

compensating the second data points in the second data point set according to the first deviation angle and the first deviation position to obtain compensated matching data points;

determining a number of ones of the compensated matching data points that satisfy following condition: a matching degree of each of the ones of the compensated matching data points and a corresponding one of the first matching data points satisfies a predetermined condition;

acquiring a second deviation angle and a second deviation position corresponding to the odometer compensation value if the number is greater than a first threshold, and generating the reset command according to the second deviation angle and the second deviation position, and adjusting the localization of the robot according to the reset command.

11. A non-transitory computer readable storage medium having stored therein instructions, which when executed by a robot, cause the robot to:

acquire first position information of the robot in a first coordinate system before the robot first executes a motion command;

acquire second position information of the robot in a second coordinate system after the robot executes the motion command;

establish a transformation model between the first position information and the second position information based on the first coordinate system and the second coordinate system;

calculate a compensation value according to the transformation model;

determine whether the compensation value is less than a preset value;

in response to the compensation value being less than the preset value, do not generate a reset command, acquire the second position information of the robot in the second coordinate system when the robot executes a next motion command, and return to execute establishing the transformation model between the first position information and the second position information based on the first coordinate system and the second coordinate system; and in response to the compensation value being not less than the preset value, generate the reset command according to the compensation value, and adjust the localization of the robot according to the reset command, wherein the compensation value is saved and used to compensate for a next time when the next motion command is received.

12. The non-transitory computer readable storage medium having stored therein instructions according to claim 11, wherein the instructions further cause the robot to:

acquire first initial data, the first initial data being position information detected by a sensor of the robot;

filter the first initial data according to a preset rule to obtain first dynamic data information and first static data information; and filter out the first dynamic data information, and determine the first static data information as the first position information.

13. The non-transitory computer readable storage medium having stored therein instructions according to claim 12, wherein the instructions further cause the robot to:
   acquire second initial data, the second initial data being position information detected by the sensor after the robot executes the motion command;
   filter the second initial data according to the preset rule to obtain second dynamic data information and second static data information; and
   filter out the second dynamic data information, and determine the second static data information as the second position information.

14. The non-transitory computer readable storage medium having stored therein instructions according to claim 11, wherein the first coordinate system and the second coordinate system are both 2D coordinate systems sharing an origin, and the instructions further cause the robot to:
   acquire a first data point set from the first position information, wherein the first data point set comprises a first position vector of each first data point;
   acquire a second data point set from the second position information, wherein the second data point set comprises a second position vector of each second data point; and
   calculate a transformation model between the first data point set and the second data point set according to an iterative closest point (ICP) algorithm based on the first position vectors and the second position vectors, wherein the transformation model comprises a translation vector and a rotation matrix.

15. The non-transitory computer readable storage medium having stored therein instructions according to claim 14, wherein the instructions further cause the robot to:
   find a second data point matching each of the first data points in the second data point set, and calculate a matching error value according to a matching model, wherein the matching model is as follows:

$$E(R, t) = \frac{1}{N_x} \sum_{i=1}^{N_x} \|P_j - RX_i - t\|^2,$$

where E(R, t) represents the mean squared error value of registration of the first data points and the second data points, $N_x$ represents a number of points in the first data point set, $X_i$ represents the first data point, $P_j$ represents the second data point, R represents the rotation matrix between the first data point set and the second data point set, and t represents the translation vector between the first data point set and the second data point set; and
   output the transformation model corresponding to the first data point set and the second data point set according to the first position vectors and the second position vectors registered according to the matching error value, the transformation model comprises the translation vector and the rotation matrix.

16. The non-transitory computer readable storage medium having stored therein instructions according to claim 15, wherein the instructions further cause the robot to:
   acquire an odometer compensation value;
   initialize the first data points in the first data point set according to the odometer compensation value to acquire first transformed data points; and
   acquire position vectors of the first transformed data points as the first position vectors.

17. The non-transitory computer readable storage medium having stored therein instructions according to claim 16, wherein the instructions further cause the robot to:
   use all the first transformed data points in the first data point set as first matching data points in sequence, the first matching data points being in the second coordinate system;
   find a second matching data point closest to each of the first matching data points in the second data point set;
   calculate a transformation rotation matrix and a transformation translation vector between the first data point set and the second data point set according to the first position vectors of the first matching data points and the second position vectors of the second matching data points;
   calculate the matching error value using the matching model according to the transformation rotation matrix and the transformation translation vector; and
   determine whether an operation process of the matching error value meets a termination condition; and if so, output the matching error value.

18. The non-transitory computer readable storage medium having stored therein instructions according to claim 17, wherein the instructions further cause the robot to:
   output a rotation matrix and a translation vector between the first matching data point set and the second matching data point set according to the matching error value when the matching error value is obtained;
   calculate a first deviation angle and a first deviation position according to the rotation matrix and the translation vector;
   compensate the second data points in the second data point set according to the first deviation angle and the first deviation position to obtain compensated matching data points;
   determine a number of ones of the compensated matching data points that satisfy following condition: a matching degree of each of the ones of the compensated matching data points and a corresponding one of the first matching data points satisfies a predetermined condition;
   acquire a second deviation angle and a second deviation position corresponding to the odometer compensation value if the number is greater than a first threshold, and
   generate the reset command according to the second deviation angle and the second deviation position, and adjust the localization of the robot according to the reset command.

* * * * *